(12) United States Patent
Desai et al.

(10) Patent No.: US 7,492,885 B2
(45) Date of Patent: Feb. 17, 2009

(54) SYSTEM AND METHOD FOR ESTABLISHING COMMUNICATION SERVICES BETWEEN DIFFERENT USERS

(75) Inventors: Ketan N. Desai, Sunrise, FL (US); Deepak P. Ahya, Plantation, FL (US); Rohit A. Talwalkar, Plantation, FL (US); Jose E. Korneluk, Boynton Beach, FL (US); Swetal A. Patel, Plantation, FL (US); Amit Ramani, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 1218 days.

(21) Appl. No.: 10/747,976

(22) Filed: Dec. 30, 2003

(65) Prior Publication Data

US 2005/0153744 A1 Jul. 14, 2005

(51) Int. Cl.
*H04M 7/00* (2006.01)
*H04B 7/00* (2006.01)
*H04Q 7/20* (2006.01)

(52) U.S. Cl. .................... 379/219; 455/426.1; 455/450; 455/518; 455/521; 455/560

(58) Field of Classification Search .... 379/219–221.02, 379/221.06; 455/426.1, 450, 515–521, 560
See application file for complete search history.

(56) References Cited

U.S. PATENT DOCUMENTS

| | | | |
|---|---|---|---|
| 5,359,317 A | 10/1994 | Gomez et al. | |
| 5,548,631 A * | 8/1996 | Krebs et al. | 455/426.1 |
| 5,850,611 A * | 12/1998 | Krebs | 455/518 |
| 6,002,948 A | 12/1999 | Renko et al. | |
| 6,009,323 A | 12/1999 | Heffield et al. | |
| 6,026,296 A * | 2/2000 | Sanders et al. | 455/426.1 |
| 6,223,035 B1 * | 4/2001 | Pierce et al. | 455/433 |
| 6,650,908 B1 * | 11/2003 | Coombes et al. | 455/560 |
| 6,792,281 B2 * | 9/2004 | Upp et al. | 455/519 |
| 6,882,856 B1 * | 4/2005 | Alterman et al. | 455/519 |
| 6,904,285 B2 * | 6/2005 | Drozt et al. | 455/450 |
| 7,295,851 B2 * | 11/2007 | Liu et al. | 455/517 |
| 7,319,879 B2 * | 1/2008 | Harris et al. | 455/458 |
| 2003/0224825 A1 * | 12/2003 | Cox et al. | 455/560 |

* cited by examiner

*Primary Examiner*—Harry S Hong
(74) *Attorney, Agent, or Firm*—Randall S. Vaas

(57) ABSTRACT

A system and method of retrieving dispatch call information from a dedicated database by using interconnect call information. Interconnect call information from an interconnect communication system is obtained. The information identifies a target dispatch subscriber unit in a dispatch communication system. A request is received from a source dispatch subscriber unit. The request includes the interconnect call information. The interconnect call information identifying the target dispatch subscriber unit is extracted from the request. The interconnect call information of the target dispatch subscriber is related to unique dispatch call connection information of the target dispatch subscriber in a dedicated database. The unique dispatch call connection information concerning the target dispatch subscriber unit from the dedicated database in the dispatch communication system is retrieved using the extracted interconnect call information from the request.

23 Claims, 7 Drawing Sheets

| BIT NUMBER | | | | | | | | OCTET NUMBER |
|---|---|---|---|---|---|---|---|---|
| 8 | 7 | 6 | 5 | 4 | 3 | 2 | 1 | |
| PROTOCOL DISCRIMINATOR | | | | TRANSACTION IDENTIFIER | | | | 1 |
| MESSAGE TYPE | | | | | | | | 2 |
| INDIVIDUAL ID | | | | | | | | 3 |
| | | | | | | | | 4 |
| | | | | | | | | 5 |
| TARGET PHONE NUMBER | | | | | | | | 6 |
| | | | | | | | | 7 |
| | | | | | | | | 8 |
| | | | | | | | | 9 |
| | | | | | | | | 10 |
| | | | | | | | | 11 |
| | | | | | | | | ... |

300  FIG. 3

| BIT NUMBER | | | | | | | | OCTET NUMBER |
|---|---|---|---|---|---|---|---|---|
| 8 | 7 | 6 | 5 | 4 | 3 | 2 | 1 | |
| PROTOCOL DISCRIMINATOR | | | | TRANSACTION IDENTIFIER | | | | 1 |
| MESSAGE TYPE | | | | | | | | 2 |
| INDIVIDUAL ID | | | | | | | | 3 |
| | | | | | | | | 4 |
| | | | | | | | | 5 |
| PRIVATE CALL INFORMATION | | | | | | | | 6 |

1002 — PROTOCOL DISCRIMINATOR / TRANSACTION IDENTIFIER
1008 — MESSAGE TYPE
1004 — INDIVIDUAL ID
1006 — PRIVATE CALL INFORMATION

1000 FIG. 10

| BIT NUMBER | | | | | | | | OCTET NUMBER |
|---|---|---|---|---|---|---|---|---|
| 8 | 7 | 6 | 5 | 4 | 3 | 2 | 1 | |
| IEI | | | | | | | | 1 |
| 8 | 7 | 6 | 5 | 4 | | CALL TYPE | | 2 |

HIDE/SHOW ID 1102    1104

1006 FIG. 11

| VALUE | DESCRIPTION |
|---|---|
| %0 | SHOW THE ID |
| %1 | HIDE THE ID |

1202 — %0
1204 — %1
1206 — SHOW THE ID
1208 — HIDE THE ID

1102 FIG. 12

| | BIT NUMBER | | | | | | | OCTET NUMBER |
|---|---|---|---|---|---|---|---|---|
| 8 | 7 | 6 | 5 | 4 | 3 | 2 | 1 | |
| 1402 — PROTOCOL DISCRIMINATOR | | | | TRANSACTION IDENTIFIER | | | | 1 |
| 1406 — MESSAGE TYPE | | | | | | | | 2 |
| 1408 — INDIVIDUAL ID | | | | | | | | 3 |
| | | | | | | | | 4 |
| | | | | | | | | 5 |
| 1410 — CHANNEL ASSIGNMENT | | | | | | | | 6 |
| | | | | | | | | 7 |
| | | | | | | | | 8 |
| 1412 — REQUESTED SEARCH DATA* | | | | | | | | 9 |
| | | | | | | | | 10 |
| | | | | | | | | 11 |
| | | | | | | | | ... |

1400 FIG. 14

SYSTEM AND METHOD FOR ESTABLISHING COMMUNICATION SERVICES BETWEEN DIFFERENT USERS

FIELD OF THE INVENTION

This invention generally relates to communication systems and services. More specifically, the invention relates to establishing communications between users having the ability to utilize different modes of communication within the system.

BACKGROUND OF THE INVENTION

Various types of communication systems and services are well known in the art. Examples of communication systems include systems that provide interconnect telephone services (e.g., cellular and land line systems) and systems that provide dispatch communication services. Cellular communication services allow for communication between two callers that have been specifically identified within the cellular system. Dispatch communication services allow for communications to occur amongst a group of callers identified in a call group. Alternatively, dispatch system users can engage in one-to-one communications via a private call. Typically, dispatch systems use a direct connect identifier (DCID) to establish the call between different users. With dispatch communications, two radios within the same network utilize signaling within the same network in order to communicate with each other.

Both types of systems are often offered to customers in many geographic areas and each may appeal to different customer bases. For example, cellular systems may be used by individuals that want to engage in direct, person-to-person communications with other individuals. On the other hand, dispatch communications are typically used for group members of a group to communicate with other group members in the group. For instance, members of public safety organizations often use dispatch communication systems to communicate with each other.

It is often necessary to determine the connection information, for example, the phone number, of a target subscriber that a system user wishes to communicate. Previous interconnect systems allow the ability to determine the connection information and supply this to a requesting user, for example, by using directory service. Additionally, previous dispatch systems provide the ability to determine connection information to complete a dispatch call. However, previous systems do not offer the ability to use interconnect call information or other types of identifiers to determine information relating to a dispatch communication call and establish the dispatch call with this information in a single step.

BRIEF DESCRIPTION OF THE DRAWINGS

FIG. 3 is a diagram showing the format of the request message in accordance with one embodiment of the invention;

FIG. 10 is a diagram showing the format of the call proceeding message in accordance with one embodiment of the invention;

FIG. 11 is a diagram showing the format of portions of the call proceeding message in accordance with one embodiment of the invention;

FIG. 12 is a diagram showing the format of portions of the call proceeding message in accordance with one embodiment of the invention;

FIG. 14 is a diagram showing the format of the call grant originator message in accordance with one embodiment of the invention.

Figure 1:
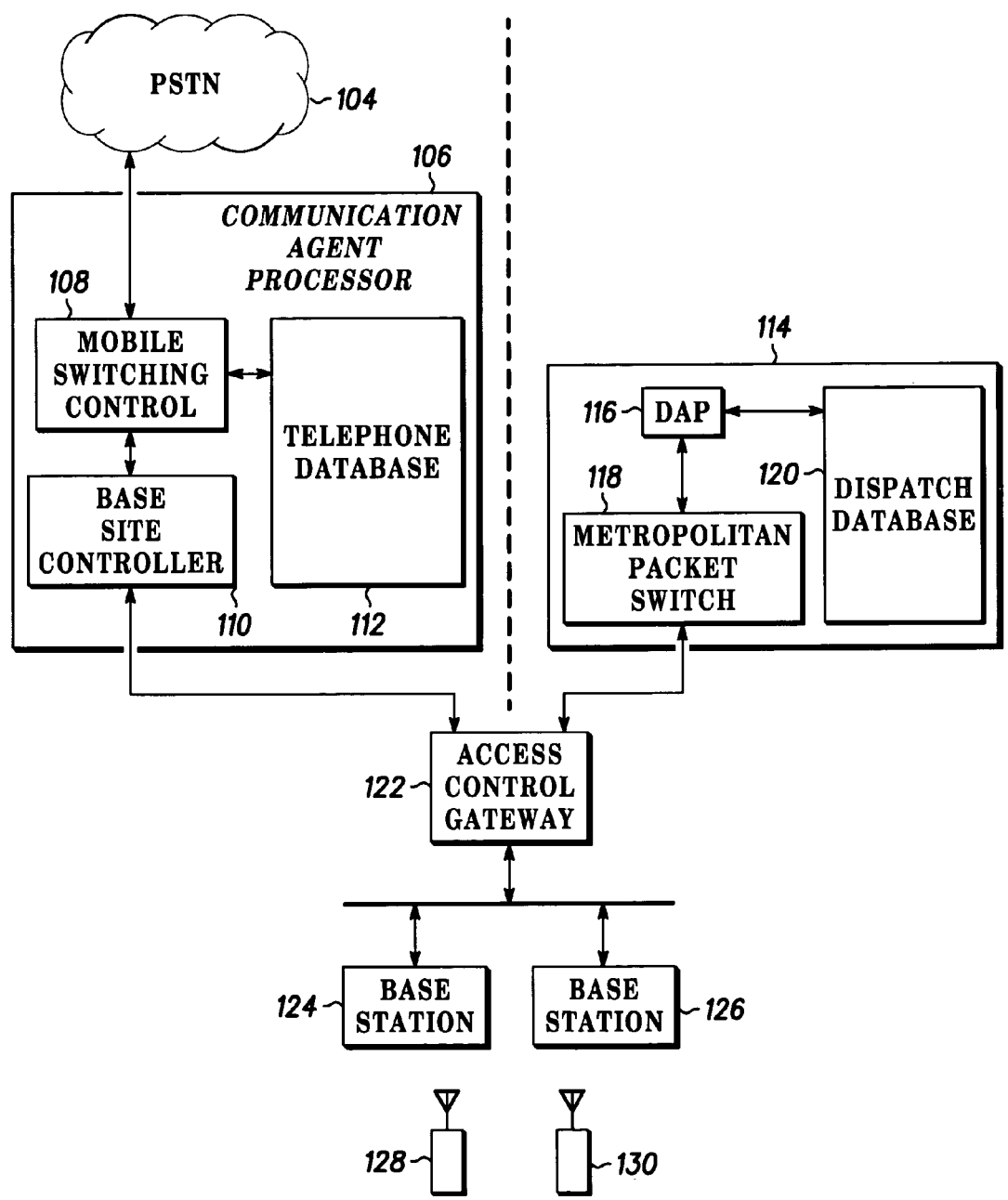
FIG. 1 is a block diagram of a system for determining information concerning a target dispatch user and establishing communications between dispatch communication system users using this information in accordance with one embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENTS

Pursuant to many of these embodiments, a system and method for determining information concerning dispatch system users and establishing communications between dispatch communication system users using this information is provided. In many of the embodiments, interconnect call information identifying a target dispatch subscriber unit or a target dispatch subscriber is determined or obtained by a user at a source dispatch subscriber unit. This information is itself used to obtain dispatch call information from a database and the extracted information is used to form a call between the source dispatch subscriber unit and the target dispatch subscriber unit. In addition, the system and method of the present invention provides various approaches to protecting the privacy of the call connection information of the user at the target dispatch subscriber unit.

In one approach, interconnect call information is determined or obtained by a user at a source dispatch subscriber unit. The information may be obtained from the interconnect telephone system (e.g., via directory assistance) or may simply be recalled by the user. The information may be of different forms and identifies a target dispatch subscriber unit in a dispatch communication system. In one example, the information is the interconnect telephone number of the target subscriber. In another example, the information is the first and last name of the subscriber at the target dispatch subscriber unit.

The source dispatch subscriber unit adds the interconnect call information to a request message and sends the request message to a processor at the dispatch system. The processor, for example, a dispatch application processor (DAP), then receives the request from the source dispatch subscriber unit.

After receiving the request message, the processor extracts the interconnect call information identifying the target dispatch subscriber unit from the request message. The processor relates the interconnect call information of the target dispatch subscriber to unique dispatch call connection information of the target dispatch subscriber in a dedicated database, for instance, a home location register (HLR). The processor retrieves the unique dispatch call connection information concerning the target dispatch subscriber unit from the dedicated database using the extracted interconnect call information extracted from the request message. A dispatch call using the unique dispatch call connection information retrieved from the database is then established between the source dispatch subscriber unit and the target dispatch subscriber unit.

In a preferred approach, the system receives permission of the subscriber at the target dispatch subscriber unit to release the unique dispatch call connection information from the dedicated database to the source dispatch subscriber unit. After receiving the permission from the subscriber, the call between the source dispatch subscriber unit and the target mobile subscriber unit is established using the unique dispatch call connection information.

In another approach, the call is established without allowing the user at the source dispatch subscriber unit to access the unique dispatch call connection information of the target dispatch subscriber unit. For example, a message can be sent to the source dispatch subscriber unit including an indication that the unique dispatch call connection information should be hidden from the source dispatch subscriber unit. In another example, a temporary identifier associated with the retrieved unique dispatch call connection information can be generated by the processor and communicated to the source dispatch subscriber unit. The temporary identifier to the retrieved information for a duration of the call.

Thus, a system and method is provided that allows interconnect calling information to be used to obtain information concerning a dispatch system user. The information then can easily and conveniently be used to establish a dispatch call between the source dispatch subscriber unit and the target dispatch subscriber unit. Users need not remember the DCID of a target dispatch user and can use interconnect information that is more easily recalled to aid in establishing the call.

In addition, the information concerning the user at the target dispatch subscriber unit is protected from unauthorized viewing by unauthorized users. Dishonest users are prevented from obtaining the information when they have no permission rights to that information.

Referring now to FIG. 1, a system 100 for determining call connection information concerning a target dispatch subscriber and establishing a call between two dispatch users is described. The system 100 includes a public switched telephone network (PSTN) 104; communication agent processor (CAP) 106; a dispatch call processor (DCP) 114; an access control gateway 122; base stations 124 and 126; and subscriber units 128 and 130. The CAP 106 includes a mobile switching center 108, a base site controller 110, and a telephone database 112. The DCP 114 includes a DAP 116, a metropolitan packet switch 118, and a dispatch database 120.

The PSTN 104 is coupled to the CAP 106. The CAP 106 is coupled to the access control gateway 122. The access control gateway 122 is coupled to the DCP 114 and the base stations 124 and 126. The subscriber units 128 and 130 are connected to the base stations 124 and 126.

The system 100 supports both telephone services 101 and dispatch services 102. Specifically, the CAP 106 supports telephone services and the DCP 114 supports dispatch call services. The access control gateway 122 comprises a computational platform having computational capacity and storage sufficient to link the CAP 106 to the DCP 114 and support the functions described elsewhere in this specification. The link between the access control gateway 122 and the CAP 106 may comprise a high-level data link control as defined by the International Standards Organization. The link between the CAP 106 and the DCP 114 may comprise a frame relay or other suitable link.

The subscriber units 128 and 130 are any type of communication units, for example, mobile communication units. These units may provide dispatch services or interconnect call services or both. In this regard, the units may be mobile dispatch units for operation in the dispatch system 102 or mobile cellular telephones for use in the telephone system 101 or include the functionality of both.

The base stations 124 and 126 comprise radio transceivers configured to transmit and receive on appropriate frequencies and using appropriate modulation and air interface protocols as necessary to support the requirements of the services being provided. The telephone services in the telephone system 101 and dispatch services in the dispatch system 102 may ideally use common frequencies and other air interface specifications.

As described above, the dispatch call processor 114 includes a dispatch application processor (DAP) 116, metropolitan packet switch 118, and a dispatch database 120. The dispatch application processor 116 allocates communications amongst dispatch service users and performs functions of alerting all members of a dispatch group that a dispatch group is going to take place or is currently under way so that all members of the group can participate in the call. The DAP 116 is used to obtain connection information concerning a target dispatch subscriber unit, for instance, the DCID, from the dispatch database 120 in order to complete a call between different dispatch system users.

As mentioned previously, the communication agent processor 106 supports telephone services 101. The communication agent processor 106 includes a mobile switching center 108, a base site controller 110, and a telephone database 112. The mobile switching center 108 and base site controller 110 can be provided as in the Global System for Mobile Communication (GSM) systems. The mobile switching center 108 interfaces with the PSTN 104 and the base site controller 110 and controls the provision of telephone services to communication units (e.g., units 128 and/or 130) being serviced by the system. Further details concerning other functions of the communication agent processor 106 and the dispatch call processor are described in U.S. Pat. No. 5,548,631, which is incorporated herein by reference in its entirety.

In one example of the operation of the system of FIG. 1, a user at a source dispatch subscriber unit 128 desires to establish a call with another dispatch unit 130. The user at the unit 128 has only interconnect call information of the user at the unit 130. For example, this information may be obtained from the telephone database 112. In another example, the user simply remembers appropriate information and enters this information into the unit 128. This information may include the interconnect number of the target dispatch subscriber or the first and last name of the target dispatch subscriber.

The unit 128 forms a request that includes the interconnect call information, which identifies the user at the target unit 130. This message is sent to the DAP 116 within the DCP 114 via the base station 124, gateway 122 and metropolitan packet switch 118. After receiving the request, the DAP 116 extracts the interconnect call information identifying the target dispatch subscriber at the subscriber unit 130 from the request. The DAP 116 relates the interconnect call information of the target dispatch subscriber to unique dispatch call connection information (e.g., the DCID) of the target dispatch subscriber in a dedicated database 120. The DAP 116 retrieves the unique dispatch call connection information concerning the target dispatch subscriber unit 130 from the dedicated database 120 in the dispatch communication system 102 using the extracted interconnect call information from the request. A dispatch call using the unique dispatch call connection information retrieved from the database is then formed between the source dispatch subscriber unit 128 and the target dispatch subscriber unit 130.

In another example of the operation of the system of FIG. 1, the user at the subscriber unit 128 selects an entry in an electronic phone book at the subscriber unit 128 and this entry indicating a target dispatch subscriber unit 130. Once the target dispatch user has been selected or determined, a call request to the target dispatch subscriber unit based upon the identity of the selected entry is formed. If the system 100 is the Motorola iDEN system, the call request includes the iDEN cellular phone number of the target dispatch subscriber unit 130. The DAP 116 receives the message, which includes the iDEN phone number and obtains the DCID of the target subscriber 130 from the database 120 and sends this to the source dispatch subscriber unit 128. The source dispatch subscriber unit stores the Dcid in the phone book. A call to the target dispatch subscriber unit is then established using the Dcid obtained from the database 120.

As described elsewhere in this application, various security features are provided so that information obtained from the database 120 is protected from unauthorized viewing by unauthorized users. For example, in one approach, the system 100 receives the specific permission of the subscriber associated with the target dispatch subscriber unit 130 to release the unique dispatch call connection information from the dedicated database 120 to the source dispatch subscriber unit 128. After receiving the permission from the subscriber, the call between the source dispatch subscriber unit 128 and the target mobile subscriber unit 130 is established using the unique dispatch call connection information. If the permission is not received, the call is not allowed to proceed.

In another approach, the call is established without allowing the user at the source dispatch subscriber unit 128 to access the unique dispatch call connection information. For example, a message can be sent to the source dispatch subscriber unit 128 including an indication that the unique dispatch call connection information should be hidden from the source dispatch subscriber unit 128. In another example, a temporary identifier associated with the retrieved unique dispatch call connection information can be generated by the DAP 116 and communicated to the source dispatch subscriber unit 128. The temporary identifier to the retrieved information for a duration of the call. Thus, using these approaches, the information concerning the user at the target dispatch subscriber unit 130 is protected from unauthorized access by unauthorized users.

Figure 2:
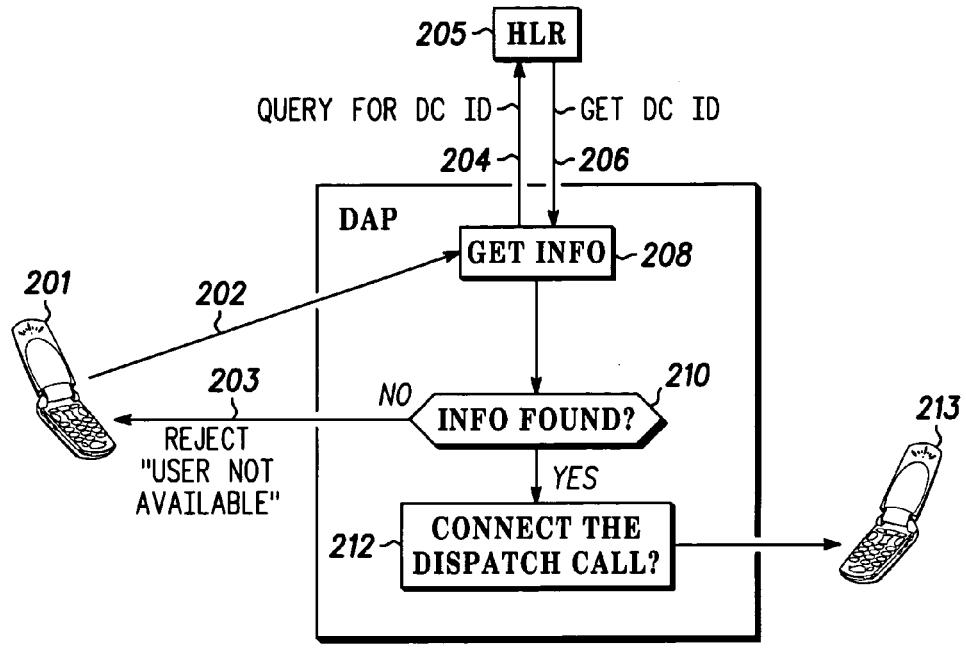
FIG. 2 is a flow chart of a method for determining information and establishing communications between dispatch communication system users in accordance with one embodiment of the invention.

Referring now to FIG. 2, one example of a method for obtaining information from a database and establishing a dispatch call is described. At step 202, a source dispatch subscriber unit 201 makes a direct connect request. For example, the request may include interconnect call information specifying the identity of a subscriber at a target dispatch subscriber unit 213. At step 204, the DAP sends a query for a direct connect ID (DCID) of the target subscriber. A database, for instance, a home location register (HLR) 205 receives the request and obtains the DCID using the interconnect information and transmits the DCID to the DAP at step 206.

At step 208, the DAP receives the DCID. At step 210, the DAP determines if the DCID has been found. If the answer is negative, then a rejection message is sent to the source dispatch subscriber unit 201 at step 209. For example, the message may inform the user at the source dispatch subscriber unit 201 that the target user is not available. If the answer at step 210 is affirmative, then at step 212 a connection is made between the source dispatch subscriber unit 201 and the target dispatch subscriber unit 213 and the dispatch call is established.

Referring now to FIG. 3, a call request message of the approach of FIG. 2 is described. A request message 300 includes an individual ID field 302, a target telephone number field 304, a protocol discriminator field 306, and a transaction identifier field 308.

The individual ID field represents the ID of the source unit. The target telephone number field 304 is the interconnect phone number of the target dispatch user. The protocol discriminator field 306 identifies the destination layer of the call, for example, the call management layer. The transaction identifier field 308 field is a unique identifier identifying the transaction, for example, an integer value.

Figure 4:
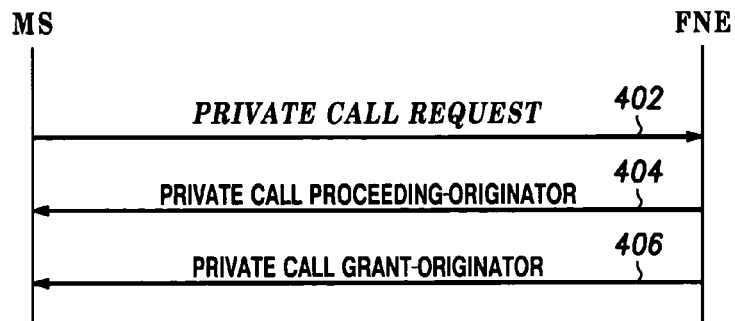
FIG. 4 is a call flow diagram of a method for determining information and establishing communications between dispatch communication system users in accordance with one embodiment of the invention.

Referring now to FIG. 4, a call flow diagram showing the exchange of messages between a source dispatch subscriber unit and a DAP is described. At step 402, a Private Request Message such as that described with respect to FIG. 3 is sent from the source dispatch subscriber unit to the DAP. At step 404, the DAP sends Private Call Proceeding Originator messages to the originator at the source dispatch subscriber unit. Multiple messages may also be sent to ensure the source unit to ensure the unit receives the message. At step 406, the DAP sends private call grant messages to the source dispatch subscriber unit. Multiple messages may also be sent to ensure the source unit to ensure the unit receives the message.

The source dispatch subscriber unit may also initiate a request using the first and last name of the target subscriber to obtain the connection information relating to the target subscriber. A message type may be created and used in the request. The DAP contacts a server when a vCard is requested or desired, and this action will result in the information being obtained from the database, for example an HLR. If the information is obtained successfully, a special permission request is sent to the target user whose information is requested. The target user may either grant or deny the request. If granted, the vCard information is sent to the originator at the source dispatch subscriber unit.

Figure 5:
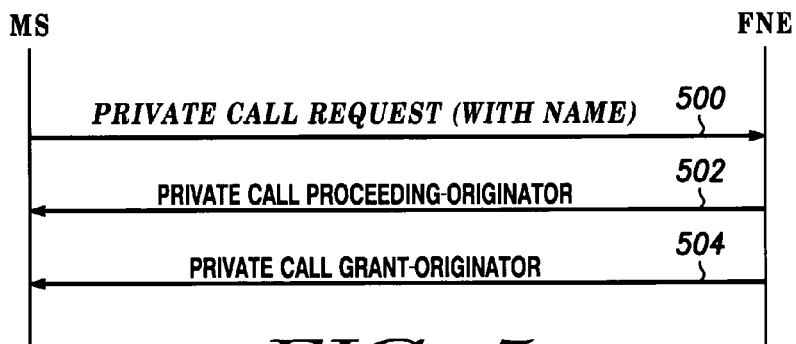
FIG. 5 is a call flow diagram of a method for determining information and establishing communications between dispatch communication system users in accordance with one embodiment of the invention.

Referring now to FIG. 5, a Private Call Request message is sent from the source dispatch subscriber unit to the DAP. The request message is identified as being of a special message type that indicates that the message includes the first and last name of the target subscriber. At step 502, the DAP returns Private Call Proceeding messages to the source dispatch subscriber unit indicating that the call is proceeding. Multiple messages may also be sent to ensure the source unit to ensure the unit receives the message. At step 504, the DAP returns Private Call Grant Originator messages to the source dispatch subscriber unit indicating that the target user has granted permission to use the information to complete the call. Multiple messages may also be sent to ensure the source unit to ensure the unit receives the message.

Figure 6:
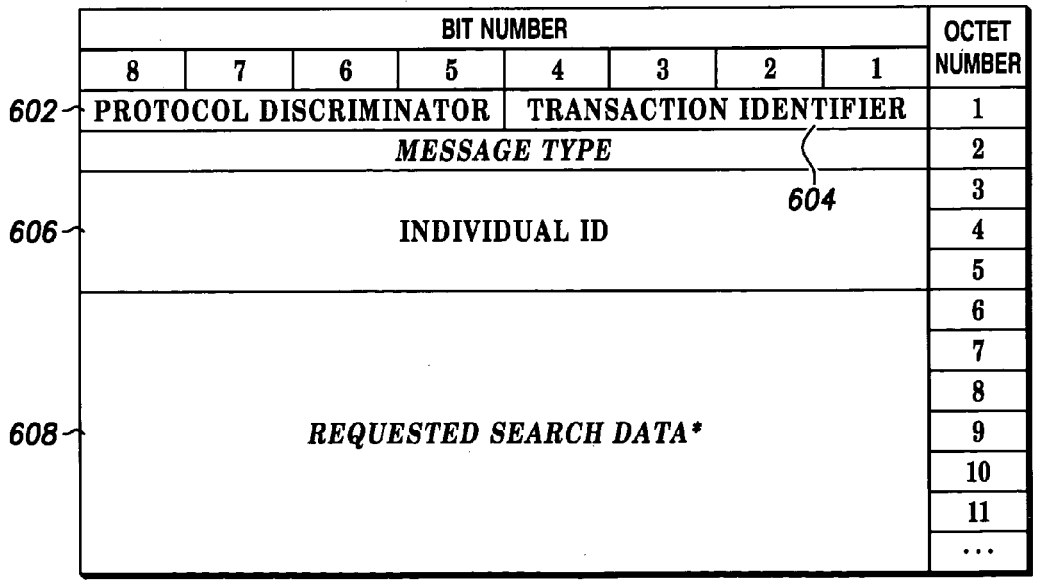
FIG. 6 is a diagram showing the format of a request message in accordance with one embodiment of the invention.

Referring now to FIG. 6, an example of a Private Call Request message 600 used in the message flow of FIG. 5 is described. The Private Call Request message 600 includes a protocol discriminator field 602, a transaction identifier field 604, an individual ID field 606, and a requested search field 608. Fields 602, 604, and 606 contain the same type of information as has been previously described with respect to FIG. 3. The requested search data field 608 includes the first and last name of the target subscriber. In one example, the field 608 is 40 bytes (20 UNICODE characters) long, which is determined and based upon the maximum width of a phonebook alias. This size can be expanded depending upon how much data the user desires to send to the DAP.

Figure 7:
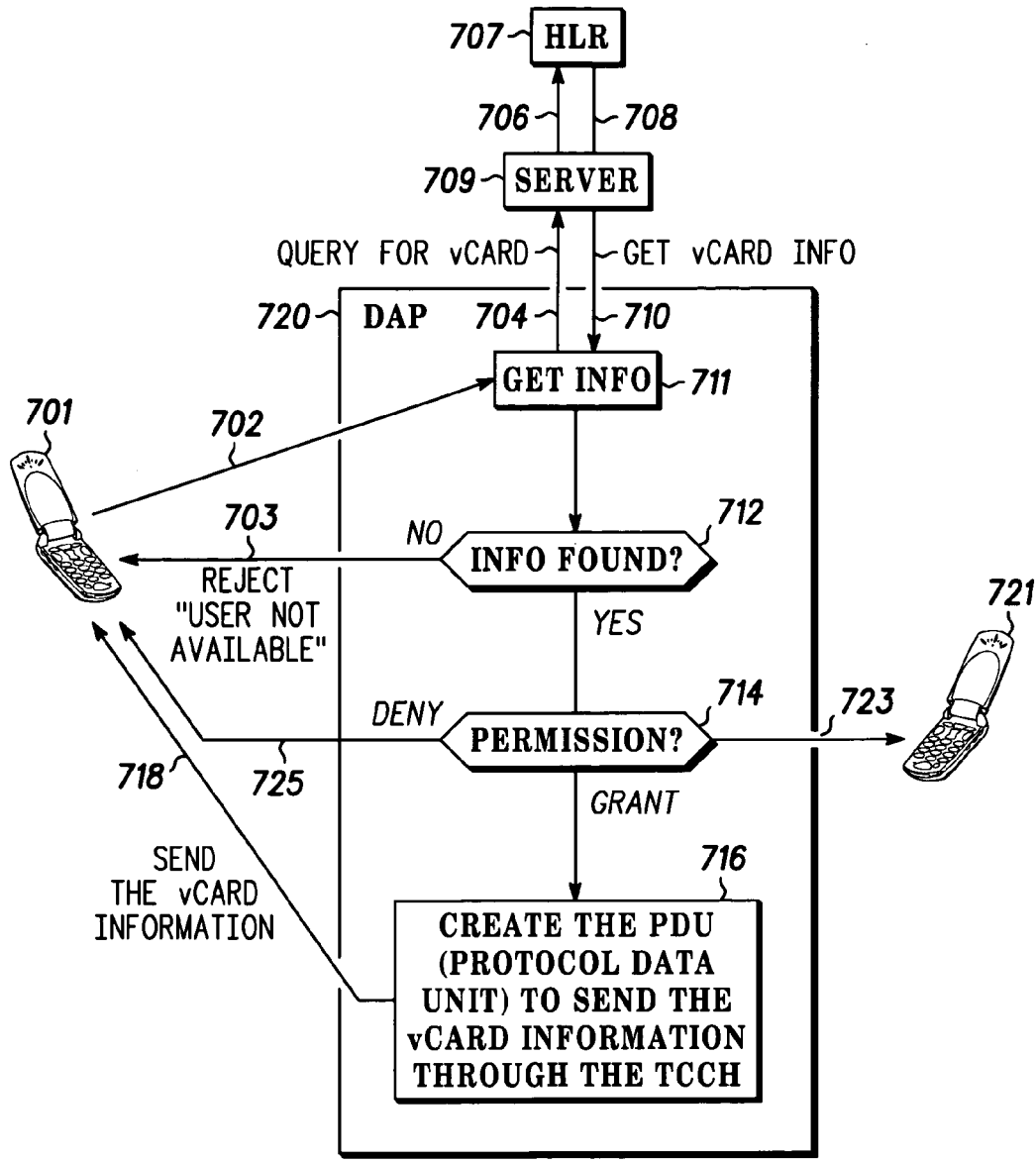
FIG. 7 is a flow chart of a method for determining information and establishing communications between dispatch communication system users in accordance with one embodiment of the invention.

Referring now to FIG. 7, another approach of obtaining and using interconnect call information to establish a dispatch call is described. At step 702, a source dispatch subscriber unit 701 sends a direct connect search request to the DAP 720 including the first and last name of the target dispatch user. At step 704, a query for vCard use is sent to a server 709. At step 706, the query is sent from the server 709 to the HLR 707. The HLR 707 obtains the requested vCard information and send it, at step 708, to the server 709. The server 709 at step 710 sends the vCard information to the DAP 720. At step 712, the DAP determines whether the information has been located. If the answer is negative, the DAP 720 sends a rejection message to the source dispatch subscriber unit, 701 at step 703. If the answer is affirmative, execution continues with step 714.

At step 714, the DAP 720 determines if the target dispatch subscriber unit 721 has sent an authorization or permission message 723. If the answer is negative, then a deny message is sent to the source mobile unit 701 at step 725. If the answer is affirmative, then at step 716, the DAP 720 creates a protocol data unit (PDU) to send the vCard information through the traffic channel to the source dispatch subscriber unit 701. At step 718, this information is sent to the source unit.

In the example of FIG. 7, a call is connected only if the target user grants permission. To avoid user interaction while still preserving the privacy of the target user, alternate approaches may be used. Specifically, and now referring to FIG. 8, one such alternate approach is described. In this approach, after locating the DCID of the target user, a call can be setup without the initiating user knowing the actual DCID of the target user.

At step 802, a request is sent from a source dispatch subscriber unit 801 to a DAP 820. The request includes the first and last names of the target user at the target dispatch subscriber unit 815. At step 804, the DAP 820 issues a query to a server 809. At step 806, the server sends the query to HLR 807. The HLR 807 locates the requested DCID and, at step 808, and sends the information to the server 809. At step 810, the server 809 sends the DCID to the DAP 820. At step 811, the DAP 820 receives the requested information.

At step 812, the DAP 820 determines if the requested information has been found. If the answer is negative, then the DAP 820 sends a rejection message to the source dispatch subscriber unit 801 at step 816. If the answer is affirmative, then at step 814, the DAP 820 hides the DCID or generates a temporary ID and connects the dispatch call between the source dispatch subscriber unit 801 and the target dispatch subscriber unit 815.

A Private Call Proceeding message sent from the DAP 820 to the source dispatch subscriber unit may be modified to include one bit indicating that the target DCID information should be hidden. The subscriber unit 801 will read this bit and will not disclose the target DCID during the course of the call. Hence, the target user's private DCID will be kept hidden from viewing by unauthorized users.

In this approach, the Private Call Proceeding originator message is sent twice and the subscriber will verify the information received is the same in both instances. If there is a difference between the information received, the information will be hidden by default. All the protocol messages are protected by half-rate error correction. Further, loss of data concerns can be alleviated by using multiple bit rate and cyclic redundancy check (CRC) procedures. In case of CRC failure, the information can be hidden by default.

Figure 8:
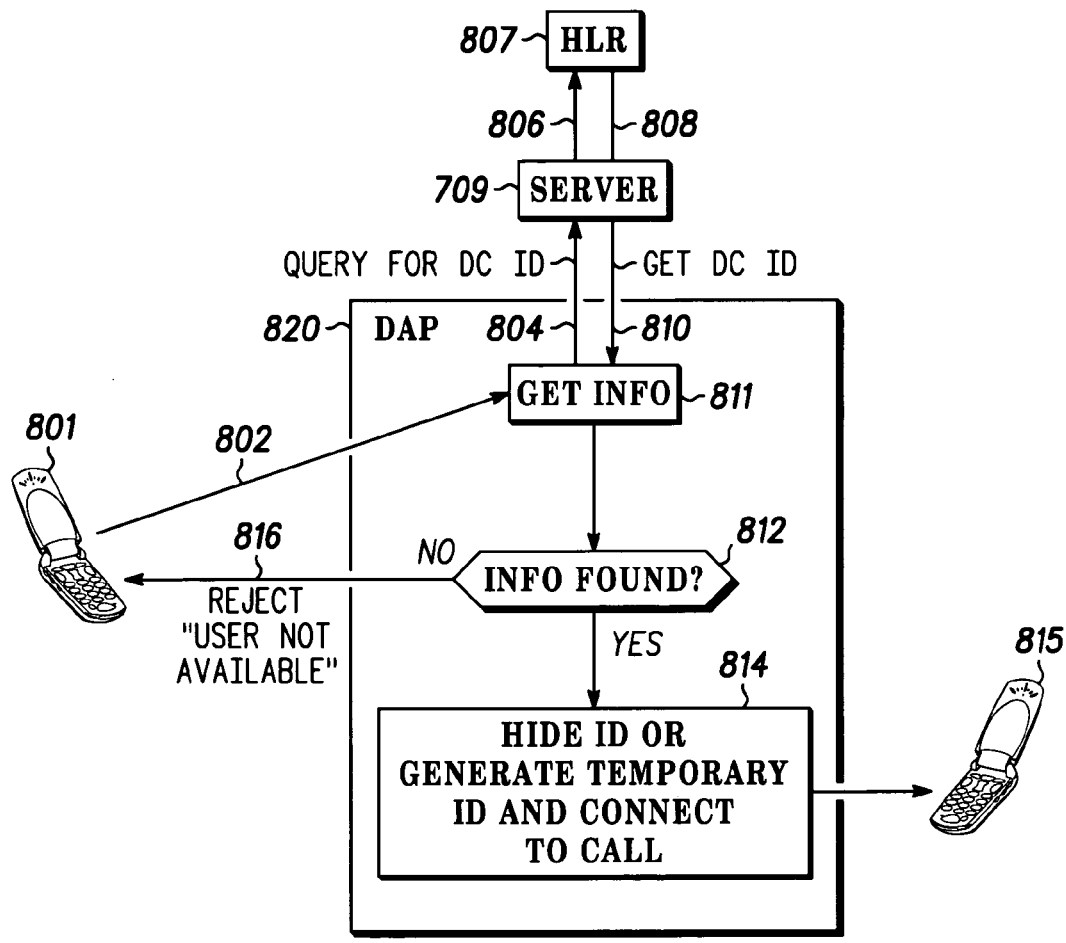
FIG. 8 is a flow chart of a method for determining information and establishing communications between dispatch communication system users in accordance with one embodiment of the invention.
Figure 9:
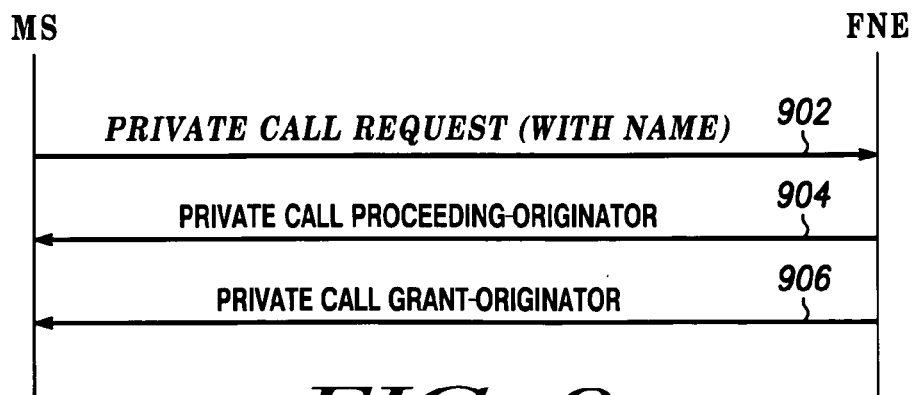
FIG. 9 is a call flow diagram of a method for determining information and establishing communications between dispatch communication system users in accordance with one embodiment of the invention.

Referring now to FIG. 9, a call flow diagram showing the interaction between a source dispatch subscriber unit and a DAP is described with respect to the approach of FIG. 8. At step 902, a private call request message is ent from the source dispatch subscriber unit to the DAP. At step 904, the DAP sends first and second Private Call Proceeding originator messages to the source dispatch subscriber unit. Multiple messages may also be sent to ensure the source unit to ensure the unit receives the message. At step 906, the DAP sends Private Call Grant messages to the source dispatch subscriber unit. Multiple messages may also be sent to ensure the source unit to ensure the unit receives the message.

Referring now to FIGS. 10-12, the format of the Private Call Proceeding message sent from the DAP to the source dispatch subscriber unit in the example of FIG. 8 is described. A Private Call Proceeding message 1000 includes a protocol discriminator field 1002, a transaction identifier field 1008, an individual ID field 1004, and a private call information field 1006. The fields 1002, 1004, and 1008 include the same information as has been previously described. The private information field 1006 includes a hide/show ID field 1102 and a call type field 1104. The call type field 1104 indicates the characteristics of the RF channel being used in the transmission. The hide/show ID field 1102 has two values 1202 and 1204, which can be set to zero or one to indicate that the information (i.e., DCID) should be hid or not hid to the user at the source dispatch subscriber unit.

Instead of hiding the DCID of the target user, in yet another approach, the DAP may generate a temporary ID. The generated ID may be communicated back to the originator at the source dispatch subscriber unit by a Private Call Grant Originator message. The user at the source dispatch subscriber unit has access and can view the temporary ID, but the DAP maintains a linkage between the DCID and the temporary ID and is the only entity that can view the DCID. Thus, the dispatch call information of the target subscriber is protected against unauthorized viewing by unauthorized users.

Figure 13:
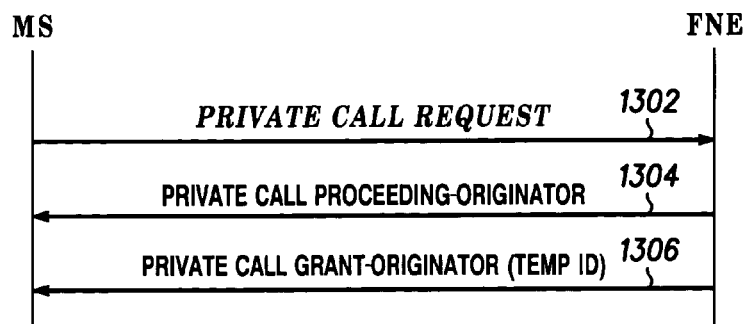
FIG. 13 is a call flow diagram of a method for determining information and establishing communications between dispatch communication system users in accordance with one embodiment of the invention.

Referring now to FIG. 13, a call flow diagram of message flow between a source dispatch subscriber unit and DAP is described. At step 1302, a Private Call Request message is sent from the source dispatch subscriber unit to the DAP. At step 1304, the DAP sends Private Call Proceeding messages to the originating user at the source dispatch subscriber unit. Multiple messages may also be sent to ensure the source unit to ensure the unit receives the message. At step 1306, the DAP sends Private Call Grant Originator messages to the source dispatch subscriber unit that include the temporary ID. Multiple messages may also be sent to ensure the source unit to ensure the unit receives the message.

Referring now to FIG. 14, an example of the structure of the Private Call Grant Originator message 1400 is described. As previously described, the DAP maps the temporarily generated ID to the target DCID for the duration of the call. This temporary ID will expire after a specified amount of time, for instance, 10 minutes and will lose mapping to the target DCID. In another case, a temporary phone number may also be used to place the call and the user can be appropriately charged.

The message 1400 includes a protocol discriminator field 1402, a transaction identifier field 1404, an individual ID field 1408, a channel assignment field 1410, and a temporary ID field 1412. The fields 1402, 1404, and 1408 have been described previously. The message type field 1406 indicates that the message hold a temporary ID. The channel assignment field 1410 indicates the channel number to be used to transmit the message from the DAP to the source dispatch subscriber unit. The temporary ID field 1412 comprises a temporarily generated ID for the transaction, which maps to the real DCID of the target subscriber for the duration of the call.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method of retrieving dispatch call information from a dedicated database for establishing a dispatch call by using interconnect call information, the method comprising:
   obtaining interconnect call information from an interconnect communication system, the information identifying a target dispatch subscriber unit in a dispatch communication system;
   receiving a request from a source dispatch subscriber unit, the request including the interconnect call information;
   extracting the interconnect call information identifying the target dispatch subscriber unit from the request;
   relating the interconnect call information of the target dispatch subscriber to unique dispatch call connection information of the target dispatch subscriber in a dedicated database;
   retrieving the unique dispatch call connection information concerning the target dispatch subscriber unit from the dedicated database in the dispatch communication system using the extracted interconnect call information from the request; and
   forming a dispatch call using the unique dispatch call connection information retrieved from the database.

2. The method of claim 1 wherein the step of receiving a request from a source dispatch subscriber unit comprises receiving a request comprising information indicative of the mobile phone number of the target dispatch subscriber unit.

3. The method of claim 1 wherein the step of receiving a request from a source dispatch subscriber unit comprises receiving a request comprising information indicative of the name of a subscriber associated with the target dispatch subscriber unit.

4. The method of claim 1 further comprising:
   receiving permission of a subscriber associated with the target dispatch subscriber unit to release the unique dispatch call connection information from the dedicated database to the source dispatch subscriber unit; and
   establishing a call between the source dispatch subscriber unit and the target mobile subscriber unit using the unique dispatch call connection information.

5. The method of claim 1 further comprising establishing a call using the unique dispatch call connection information without allowing a user at the source dispatch subscriber unit to access the unique dispatch call connection information.

6. The method of claim 5 wherein the step of establishing the call comprises sending a message to the source dispatch subscriber unit including an indication that the unique dispatch call connection information should be hidden from the source dispatch subscriber unit.

7. The method of claim 5 wherein the step of establishing the call comprises generating a temporary identifier, the temporary identifier associated with the retrieved unique dispatch call connection information, communicating the temporary identifier to the source dispatch subscriber unit, and linking the temporary identifier to the retrieved information for a duration of the call.

8. A method for forming a dispatch call between a source dispatch subscriber unit and a target dispatch subscriber unit using interconnect call information comprising:
   obtaining interconnect call information from an interconnect communication system, the information identifying a target dispatch subscriber unit in a dispatch communication system;
   sending a request to a controller, the request including the interconnect call information identifying a target dispatch subscriber unit;
   receiving customer dispatch direct connect information from the controller, the dispatch direct connect information indicating a dispatch number of the target dispatch subscriber unit; and
   establishing a direct connect dispatch call between the source dispatch subscriber unit and the target dispatch subscriber unit using the obtained dispatch direct connect information.

9. The method of claim 8 wherein the step of sending a request to the controller comprises sending a request comprising information indicative of a phone number of the target dispatch subscriber unit.

10. The method of claim 8 wherein the step of sending a request to the controller comprises sending a request comprising information indicative of a name of a subscriber associated with the target dispatch subscriber unit.

11. The method of claim 8 further comprising
    obtaining permission of the target subscriber to release the information from a dedicated database to the source dispatch subscriber unit.

12. The method of claim 8 further comprising establishing a call using the information received from the controller without being able to access the information.

13. The method of claim 12 wherein the step of establishing the call comprises receiving a message from the controller comprising an indication that the information should be inaccessible by the source mobile unit.

14. The method of claim 12 wherein the step of establishing the call comprises receiving a temporary identifier from the controller and linking the temporary identifier to the information received from the controller for the duration of the call.

15. A method of obtaining the target DCID using interconnect call information comprising:
    selecting an entry in an electronic phone book, the entry indicating a target dispatch subscriber unit;
    initiating a call request to the target dispatch subscriber unit based upon the identity of the selected entry, the call request including the iDEN cellular phone number of the target dispatch subscriber unit;
receiving a message including the target iDEN number;
obtaining the DCID relating to the target dispatch subscriber using the iDEN phone number;
storing the DCID in the phone book; and
establishing a call to the target dispatch subscriber unit using the DCID.

16. The method of claim 15 further comprising querying a database using the iDEN number and obtaining the DCID of the target dispatch subscriber unit from the database.

17. The method of claim 16 further comprising sending a private identifier of a source dispatch subscriber unit to the target dispatch subscriber unit.

18. A control system for obtain dispatch connection information from a database comprising:
a temporary memory;
a receiver, coupled to the memory, the receiver obtaining a message from a source dispatch subscriber unit and storing the message in the memory, the message including information indicative of a target dispatch subscriber unit; and
a controller communicatively coupled to the receiver and having an output, such that the controller extracts the information indicative of the target dispatch subscriber unit from the message in the memory and places the extracted information on the output.

19. The control system of claim 18 further comprising a database coupled to the output of the controller, the database being actuated by the information on the output to extract an entry related to the target dispatch subscriber unit.

20. A dispatch subscriber unit comprising:
an entry device for receiving interconnect call information identifying a target dispatch subscriber unit;
a transmitter coupled to the entry device for transmitting a message to a system processor, the message including the interconnect call information indicative of the target dispatch subscriber unit;
a temporary memory;
a receiver coupled to the memory, the receiver receiving connection information indicative of the target dispatch subscriber unit retrieved from a data base as a result of transmitting the message from the system processor, the receiver storing the connection information in the memory; and
a controller, coupled to the receiver, for causing the transmitter to transmit the message to the system processor and for establishing a connection between the dispatch subscriber unit and the target dispatch subscriber unit using the connection information stored in the memory.

21. The dispatch subscriber unit of claim 20 wherein the controller further comprises means for establishing the connection using the information received from the system controller without the source dispatch subscriber unit having access to the information.

22. The dispatch subscriber unit of claim 20 wherein the controller further comprises means for establishing the connection by receiving a message from the system controller that comprises an indication that the information should be inaccessible to the dispatch subscriber unit.

23. A method of retrieving dispatch call information from a dedicated database by using interconnect call information, the method comprising:
obtaining interconnect call information from an interconnect communication system, the information identifying a target dispatch subscriber unit in a dispatch communication system;
receiving a request from a source dispatch subscriber unit, the request including the interconnect call information;
extracting the interconnect call information identifying the target dispatch subscriber unit from the request;
relating the interconnect call information of the target dispatch subscriber to unique dispatch call connection information of the target dispatch subscriber in a dedicated database; and
retrieving the unique dispatch call connection information concerning the target dispatch subscriber unit from the dedicated database in the dispatch communication system using the extracted interconnect call information from the request.

* * * * *